United States Patent
Heo et al.

(10) Patent No.: US 9,000,737 B2
(45) Date of Patent: Apr. 7, 2015

(54) MAXIMUM POWER EXTRACTION DEVICE

(71) Applicant: Electronics and Telecommunications Research Institute, Daejeon (KR)

(72) Inventors: Sewan Heo, Daejeon (KR); Yil Suk Yang, Daejeon (KR); Jong-Kee Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 149 days.

(21) Appl. No.: 13/903,014

(22) Filed: May 28, 2013

(65) Prior Publication Data

US 2014/0176108 A1    Jun. 26, 2014

(30) Foreign Application Priority Data

Dec. 21, 2012    (KR) .......................... 10-2012-0151064

(51) Int. Cl.
  *H02M 3/06* (2006.01)
  *H02J 3/38* (2006.01)
  *H02M 3/157* (2006.01)
  *H02M 3/158* (2006.01)

(52) U.S. Cl.
  CPC .............. *H02J 3/385* (2013.01); *H02M 3/1588* (2013.01)

(58) Field of Classification Search
  USPC .......... 323/222, 299, 283, 297, 298, 353, 354
  See application file for complete search history.

(56) References Cited

U.S. PATENT DOCUMENTS

| | | | | |
|---|---|---|---|---|
| 4,810,948 A | * | 3/1989 | Takuma | ......................... 323/280 |
| 6,614,210 B2 | * | 9/2003 | Sundaram et al. | ............. 323/354 |
| 7,868,596 B2 | * | 1/2011 | Alessandro et al. | .......... 323/222 |
| 7,888,917 B2 | * | 2/2011 | Olson | ........................... 323/222 |
| 2010/0263711 A1 | | 10/2010 | Kanai | |
| 2012/0176102 A1 | | 7/2012 | Kim et al. | |

FOREIGN PATENT DOCUMENTS

KR    10-2011-0084676 A    7/2011

* cited by examiner

*Primary Examiner* — Gary L Laxton
(74) *Attorney, Agent, or Firm* — Rabin & Berdo, P.C.

(57) ABSTRACT

Provided is a maximum power extraction devices including: a battery; a voltage control unit adjusting a size of a first power outputted from the battery according to a resistor selected from a plurality of resistors, and generating a compare signal according to a size difference between an operating voltage adjusting the size of the first power depending on the selected resistor and a reference voltage; a switching unit connected between the battery and a load and adjusting a size of the operating voltage according to a size difference of the compare signal in response to first and second switching control signals; a switching control unit generating the first and second switching control signals to allow a size between the operating voltage according to the compare signal and the reference voltage to be within an error range; and a maximum power control unit measuring the number of first operations obtained by counting the occurrence number of the first or second switching control signals for a predetermined time, when the compare signal is within the error range.

12 Claims, 5 Drawing Sheets

MAXIMUM POWER EXTRACTION DEVICE

CROSS-REFERENCE TO RELATED APPLICATIONS

This U.S. non-provisional patent application claims priority under 35 U.S.C. §119 of Korean Patent Application No. 10-2012-0151064, filed on Dec. 21, 2012, the entire contents of which are hereby incorporated by reference.

BACKGROUND OF THE INVENTION

The present invention disclosed herein relates to a maximum power extraction device, and more particularly, to a maximum power extraction device extracting maximum power by using the number of operations representing the size of current.

Among renewable energy sources, a solar energy resource generates the largest amount of power. Accordingly, various solar energy developments have been made until now. Especially, various developments on a solar battery collecting solar energy and converting it into electrical energy have been made.

In relation to a solar battery, the amount of energy varies according to the intensity of solar light or the angle of light. The intensity of solar light, i.e., a condition given from the outside, cannot be artificially changed. Also, the angle of solar light may be adjusted by changing the direction of a solar battery, but changing the direction requires high power consumption.

Moreover, an output voltage determining the size of a power generated from a solar battery may be easily adjusted through a power controlling device. That is, an output power may be adjusted by adjusting an output voltage. Accordingly, in order to extract the maximum power from a solar battery, it is necessary to adjust an output voltage.

There is a method of controlling voltage and current by using a DC-DC converter in order to extract the maximum power from a solar battery. However, a device including a voltmeter and an ammeter to extract the maximum power becomes more complex as various digital signals are generated.

SUMMARY OF THE INVENTION

The present invention provides a maximum power extracting device extracting the maximum power without a complex configuration such as an ammeter and a voltmeter.

Embodiments of the present invention provide maximum power extraction devices including: a battery; a voltage control unit adjusting a size of a first power outputted from the battery according to a resistor selected from a plurality of resistors, and generating a compare signal according to a size difference between an operating voltage adjusting the size of the first power depending on the selected resistor and a reference voltage; a switching unit connected between the battery and a load and adjusting a size of the operating voltage according to a size difference of the compare signal in response to first and second switching control signals; a switching control unit generating the first and second switching control signals to allow a size between the operating voltage according to the compare signal and the reference voltage to be within an error range; and a maximum power control unit measuring the number of first operations obtained by counting the occurrence number of the first or second switching control signals for a predetermined time, when the compare signal is within the error range, wherein the maximum power control unit compares the number of the first operations with the number of second operations obtained by counting a size of a maximum power in the load according to the internally stored operating voltage, and then, generates a select signal for changing a selection on the plurality of resistors on the basis of a comparison result to adjust the size of the first power.

In some embodiments, the battery may receive solar energy and may convert the received solar energy into electrical energy.

In other embodiments, when the number of the first operations is less than the number of the second operations, the select signal may be generated to select a resistor for lowering the operating voltage from among the plurality of resistors, and when the number of the first operations is greater than the number of the second operations, the select signal may be generated to select a resistor for raising the operating voltage from among the plurality of resistors, so as to adjust the size of the first power.

In still other embodiments, the maximum power control unit may include: a counter unit storing the number of the first operations obtained by counting the occurrence number of the first or second switching control signals; a data unit storing the number of the second operations obtained by counting a size of a maximum power in the load according to the operating voltage; a counter comparator comparing the number of the first operations with the number of the second operations; and a resistor selection unit generating the select signal to adjust the size of the first power on the basis of a comparison result from the counter comparator.

In even other embodiments, the voltage control unit may include: the plurality of resistors; a multiplexer selecting one of the plurality of resistors in response to the select signal; and a comparator comparing a size difference between an output signal for a size of an operating voltage of the selected resistor and a signal of the reference voltage and delivering the compare signal to the switching control unit on the basis of a comparison result.

In yet other embodiments, the size of the first power may be adjusted through a voltage distribution using the plurality of resistors.

In further embodiments, the switching unit may convert the size of the first power into a size of a second power through a DC-DC conversion and may deliver the converted second power to the load.

In other embodiments of the present invention, maximum power extraction devices include: a battery; a voltage control unit adjusting a size of a first power outputted from the battery according to a resistor selected from a plurality of resistors, and generating a compare signal according to a size difference between an operating voltage adjusting the size of the first power depending on the selected resistor and a reference voltage; a switching unit connected between the battery and a load and adjusting a size of the operating voltage according to a size difference of the compare signal in response to first and second switching control signals; a switching control unit generating the first and second switching control signals to allow a size between the operating voltage according to the compare signal and the reference voltage to be within an error range; and a maximum power control unit storing a size of a first power resulting from a product of the number of operations obtained by counting the occurrence number of the first or second switching control signals for a predetermined time and the operating voltage, when the compare signal is within the error range, wherein the maximum power control unit compares the size of the first power with a size of a second power obtained by the most recent multiplication, and generates a select signal to change a selection on the plurality of resistors on the basis of a comparison result.

In some embodiments, the maximum power control unit may include: a counter unit storing the number of the first operations obtained by counting the occurrence number of the first or second switching control signals; an arithmetic unit outputting the size of the first power by multiplying the operating voltage by the number of the operations; a data unit storing the size of the second power obtained by the most recent multiplication; a first comparator receiving the sizes of the first and second powers and compare the received sizes; and a resistor selection unit generating the select signal for adjusting the size of the first power on the basis of a comparison result from the first comparator.

In other embodiments, the voltage control unit may include: the plurality of resistors; a multiplexer selecting one of the plurality of resistors in response to the select signal; and a comparator comparing a size difference between an output signal for a size of an operating voltage of the selected resistor and a signal of the reference voltage and delivering the compare signal to the switching control unit on the basis of a comparison result.

In still other embodiments, the size of the first power may be adjusted through a voltage distribution using the plurality of resistors.

In even other embodiments, the switching unit may convert the size of the first power into a size of a second power through a DC-DC conversion and may deliver the converted second power to the load.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
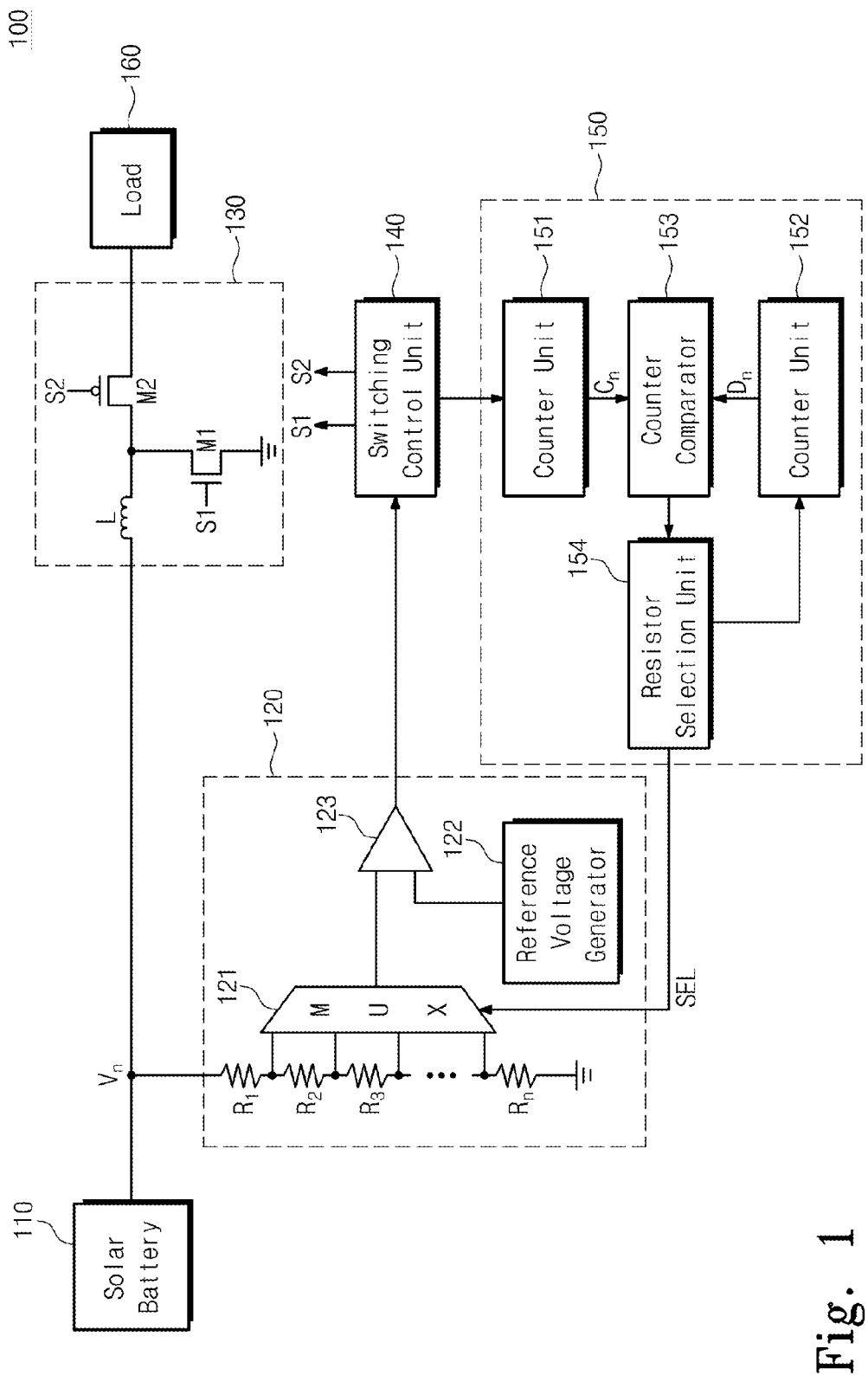
FIG. 1 is a block diagram of a maximum power extraction device according to an embodiment of the present invention.

FIG. 1 is a block diagram of a maximum power extraction device according to an embodiment of the present invention. Referring to FIG. 1, the maximum power extraction device 100 includes a solar battery 110, a voltage control unit 120, a switching unit 130, a switching control unit 140, and a maximum power control unit 150, and a load 160.

The solar battery 110 receives solar energy from the sun. Also, the solar battery 110 converts the received solar energy into the form of electrical energy. In this way, the solar battery 110 converts the received solar energy into the form of electrical energy as a first power, and then, delivers the converted first power into the switching unit 130.

Here, the size of solar energy is a factor that cannot be artificially changed. However, although there is a method of adjusting the size of solar energy by adjusting the angle of light, this requires high power consumption. Accordingly, as a method of adjusting the size of the output power of the solar battery 110, a method of adjusting the size of the output power through the output voltage of the solar battery 110 is mainly used.

The voltage control unit 120 includes a plurality of resistors R1 to Rn, a multiplexer 121, a reference voltage generator 122, and a comparator 123. The voltage control unit 120 may adjust the size of the first power generated from the solar battery 110 by using an operating voltage Vn. Here, the operating voltage Vn refers to an output voltage adjusting the size of a power to be generated from the solar battery 110. That is, the size of an output power generated from the solar battery 110 may be changed through an output voltage. In this way, the voltage control unit 120 may maximize the size of the first power generated from the solar battery 110 by using the operating voltage Vn.

The multiplexer 121 selects one of the plurality of resistors R1 to Rn in response to a select signal applied from the maximum power control unit 150. Also, the multiplexer 121 delivers the size signal of the operating voltage Vn according to the selected resistor to the comparator 123.

The reference voltage generator 122 generates a predetermined size of a reference voltage Vref, which is not affected from an external voltage, and then, delivers the reference voltage Vref to the comparator 123.

The comparator 123 receives the size signal of the operating voltage for the resistor selected from the multiplexer 121 among the plurality of resistors R1 to Rn. Also, the comparator 123 receives the reference voltage Vref from the reference voltage generator 122 and compares it with the operating voltage Vn. The comparator 123 compares a size difference between the operating voltage Vn and the reference voltage Vref, and then, according to a comparison result, generates a compare signal to deliver it to the switching control unit 140. Additionally, in comparing the operating voltage Vn and the reference voltage Vref, in addition to the comparator 123, an error amplifier may be used.

The switching unit 130 receives the first power generated from the solar battery 110, and converts the received first power into DC-DC as a second power. That is, the switching unit 130 receives the operating voltage Vn and generates a driving voltage to supply it to the load 160. The switching unit 130 includes an NMOS transistor M1, a PMOS transistor M2, and an inductor L.

The switching control unit 140 receives a compare signal from the comparator 123. Then, the switching control unit 140 controls the switching unit 130 to allow a size difference between the operating voltage Vn and the reference voltage Vref to be equal in response to the received compare signal. Here, the switching control unit 140 adjusts a size difference of the compare signal by controlling the switching unit 130, instead of adjusting a size difference of the compare signal by changing the selection on a resistor. Also, when a size difference of the compare signal is within a predetermined error range, a counter unit 1515 counts an operation of the switching control unit 140 for a predetermined time so as to measure a maximum power. Also, since the size of a power outputted from the solar battery 100 changes continuously, it is assumed that the size of power is identical when a size difference of the compare signal is within a predetermined error range.

The switching control unit 140 generates first and second control signals S1 and S2 to control a DC-DC conversion operation of the switching unit 130. Also, the NMOS and PMOS transistors M1 and M2 serve as switches. The switching control unit 140 generates a first control signal S1 to control the NMOS transistor M1 and generates a second control signal to control the PMOS transistor M2. The switching control unit 140 controls the turn-on and turn-off operations of the NMOS and PMOS transistors M1 and M2 by using the first and second control signals S1 and S2.

In more detail, when the NMOS transistor M1 is turned on in response to the first control signal S1, the PMOS transistor M2 may be turned off in response to the second control signal S2. At this point, induced voltage is formed in the inductor L. Also, when the NMOS transistor M1 is turned off in response to the first control signal S1, the PMOS transistor M2 may be turned on in response to the second control signal S2. At this point, the induced voltage formed in the inductor L is delivered to the load 160. In this way, the NMOS and PMOS transistors M1 and M2 operate complementary to each other.

Thus, the switching control unit 140 controls a DC-DC conversion operation to allow a size difference between the reference voltage Vref and the operating voltage Vn to be identical in response to a compare signal according to the selected resistor. Also, when a size difference of the compare signal is within a predetermined error range, the counter unit 151 counts an operation of the switching control unit 140 for a predetermined time.

The maximum power control unit 150 includes the counter unit 151, a data unit 152, a counter comparator 153, and a resistor selection unit 154. The counter unit 151 counts the repeating turn-on and turn-off operations of the NMOS and PMOS transistors M1 and M2 in response to the first and second control signals S1 and S2. That is, the counter unit 151 counts the operations of the NMOS and PMOS transistors M1 and M2, which are controlled by the switching control unit 140, for a predetermined time when a compare signal according to the selected resistor among the plurality of resistors R1 to Rn is within a predetermined error range. The counted operations are digitized and stored as the number of operations. Here, the number of operations refers to a total number of iterations of the process that the NMOS or PMOS transistor M1 or M2 is turned on and then turned off once.

Then, the counter unit 151 delivers a counter signal Cn for the stored number of operations to the counter comparator 153. Additionally, each time the size of the operating voltage Vn according to the selected resistor from among the plurality of resistors R1 to Rn is changed, information on a previous count is initialized.

The data unit 152 stores the number of operations of the maximum power of each operating voltage Vn according to the selected resistor from among the plurality of resistors R1 to Rn. In this way, since the number of operations of the maximum power of each operating voltage Vn is stored in the data unit 152, it is determined whether a currently selected operating voltage Vn is the maximum power. Additionally, the data unit 152 receives information on the operating voltage Vn selected from the resistor selection unit 154. In this way, the data unit 152 delivers a maximum counter signal Dn for the maximum power of the selected operating voltage Vn to the counter comparator 153.

The counter comparator 153 compares the counter signal Cn received from the counter unit 151 and the maximum counter signal Dn received from the data unit 152. Also, the counter comparator 153 delivers a signal for adjusting the size of an operating voltage Vn to the resistor selection unit 154 in response to the compared value.

Also, the counter comparator 153 delivers a signal for adjusting the size of an operating voltage Vn to the resistor selection unit 154 in response to the compared value. Then, the resistor selection unit 154 delivers the generated select signal SEL to the multiplexer 121. Accordingly, the multiplexer 121 selects one of the plurality of resistors R1 to Rn in response to the received select signal SEL. Additionally, the resistor selection unit 154 delivers information on an operating voltage Vn changed in response to the select signal SEL to the data unit 152. That is, one resistor is selected from the plurality of resistors R1 to Rn in response to the select signal SEL, so that the size of an operating voltage Vn is adjusted.

Also, the resistor selection unit 154 delivers information on a change in operating voltage Vn according to the selected resistor to the data unit 152. Accordingly, the data unit 152 delivers the number of operations of a maximum power for an operating voltage Vn according to the selected resistor to the counter comparator 153.

In this way, the maximum power extraction device 100 adjusts the size of a power by using the operating voltage Vn, instead of using an arithmetic unit having a complex configuration, in order to maximize the first power outputted from the solar battery 110. The maximum power extraction device 100 maintains the maximum size of a power more simply by adjusting the size of a power with an operating voltage Vn.

Figure 2:
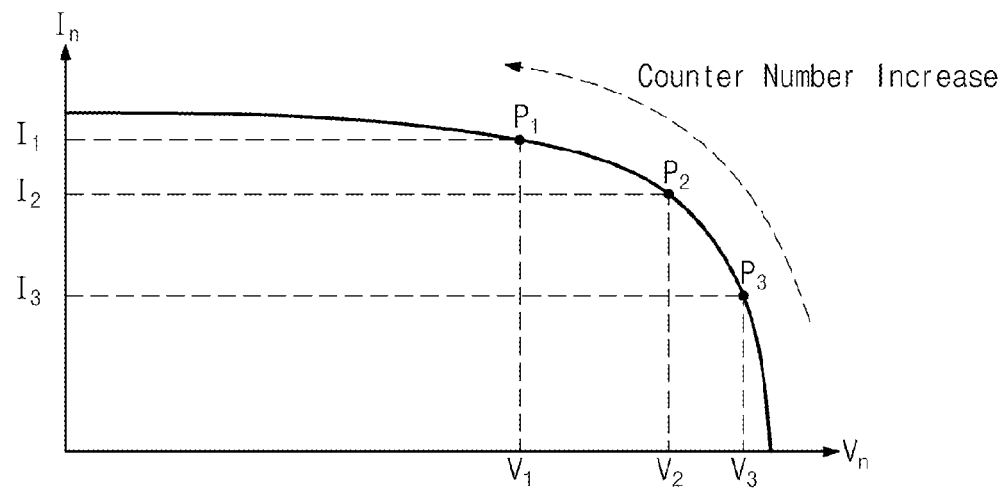
FIG. 2 is a current-voltage graph of an operating voltage change according to an embodiment of the present invention.

FIG. 2 is a current-voltage graph of an operating voltage change according to an embodiment of the present invention. Referring to FIG. 2, it may be seen that the position of a power is changed according to the size of an operation voltage Vn. It is assumed that first to third operating voltages V1, V2, and V3 shown in FIG. 2 are selected and determined by three resistors from among the plurality of resistors R1 to Rn. Then, first to third currents I1, I2, and I3 according to the first to third operating voltages V1, V2, and V3 are delivered to the switching unit 130 of FIG. 1.

In more detail, the size of a current for each operating voltage according to the selected resistor may be recognized through the number of operations measured by the counter unit 151 of FIG. 1. That is, as a current according to each operating voltage is applied to the inductor L of FIG. 1, forming an induced voltage and discharging it to a load are regarded as one operation. Accordingly, the large number of operations means a large size of current. Therefore, the number of operations is the largest in the first current I1 having the largest size and the number of operations is the smallest in the third current I3 having the smallest size.

In this way, the size of a power outputted from the solar battery 110 may be changed in response to the size of the operating voltage Vn and current In. That is, the size of an operating voltage Vn may be adjusted by the size of a current.

For example, it is assumed that the second power P0 is the point at which the maximum power is extracted as shown in FIG. 2. When the voltage control unit 120 of FIG. 1 selects a resistor for the size of the third operating voltage V3, the maximum power control unit 150 of FIG. 1 recognizes the number of operations in response to the size of the third current I3. Then, since the number of operations of the third current I3 is less than the number of operations of the second current I2, the maximum power control unit 150 delivers a select signal SEL to the voltage control unit 120 to lower the size of an operating voltage Vn. Accordingly, the size of the third operating voltage V3 is lowered and the size of the third current I3 is increased, so that the number of operations is increased. That is, the third power P3 approaches the second power P0.

On the contrary, when the voltage control unit 120 of FIG. 1 selects a resistor for the size of the first operating voltage V1, the maximum power control unit 150 of FIG. 1 recognizes the number of operations in response to the size of the first current I1. Then, since the number of operations of the first current I1 is greater than the number of operations of the second current I2, the maximum power control unit 150 delivers a select signal SEL to the voltage control unit 120 to increase the size of an operating voltage Vn. Accordingly, the size of the third operating voltage V3 is increased and the size of the third current I3 is decreased, so that the number of operations is reduced. That is, the first power P1 approaches the second power P0.

Figure 3:
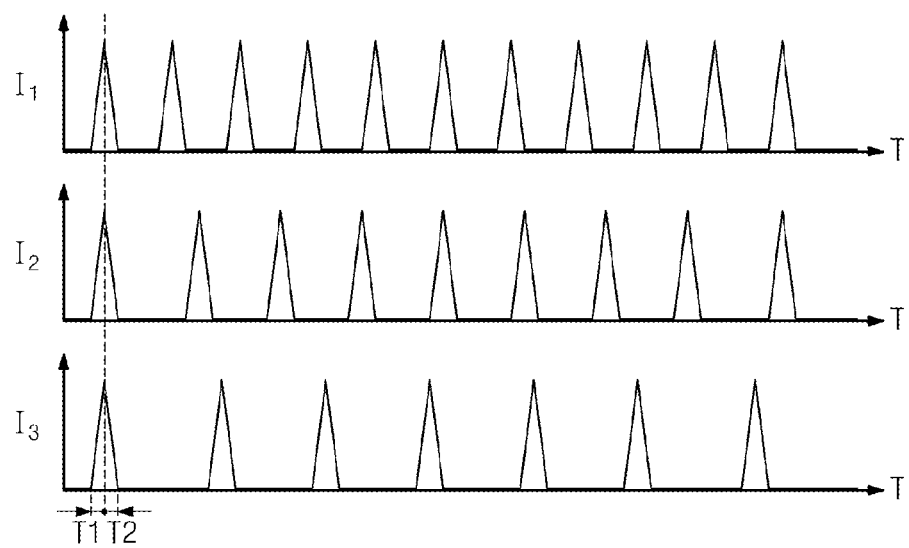
FIG. 3 is a view illustrating the number of operations according to each operating voltage of FIG. 2.

FIG. 3 is a view illustrating the number of operations according to each operating voltage of FIG. 2. Referring to FIG. 3, an induced voltage is formed in the inductor L during a section T1 in response to the turn-on of the NMOS transistor M1, and the induced voltage formed in the inductor L is supplied to the load 160 of FIG. 1 during a section T2 in response to the turn-on of the PMOS transistor M2. It is regarded that the number of operations in the section T1 or T2 is measured once.

Therefore, the number of operations is the largest in the first current I1 having the largest size and the number of operations is the smallest in the third current I3 having the smallest size.

In this way, the maximum power extraction device 100 adjusts the operating voltage Vn according to the number of operations representing the size of current, so that a point having the maximum power may be found.

Figure 4:
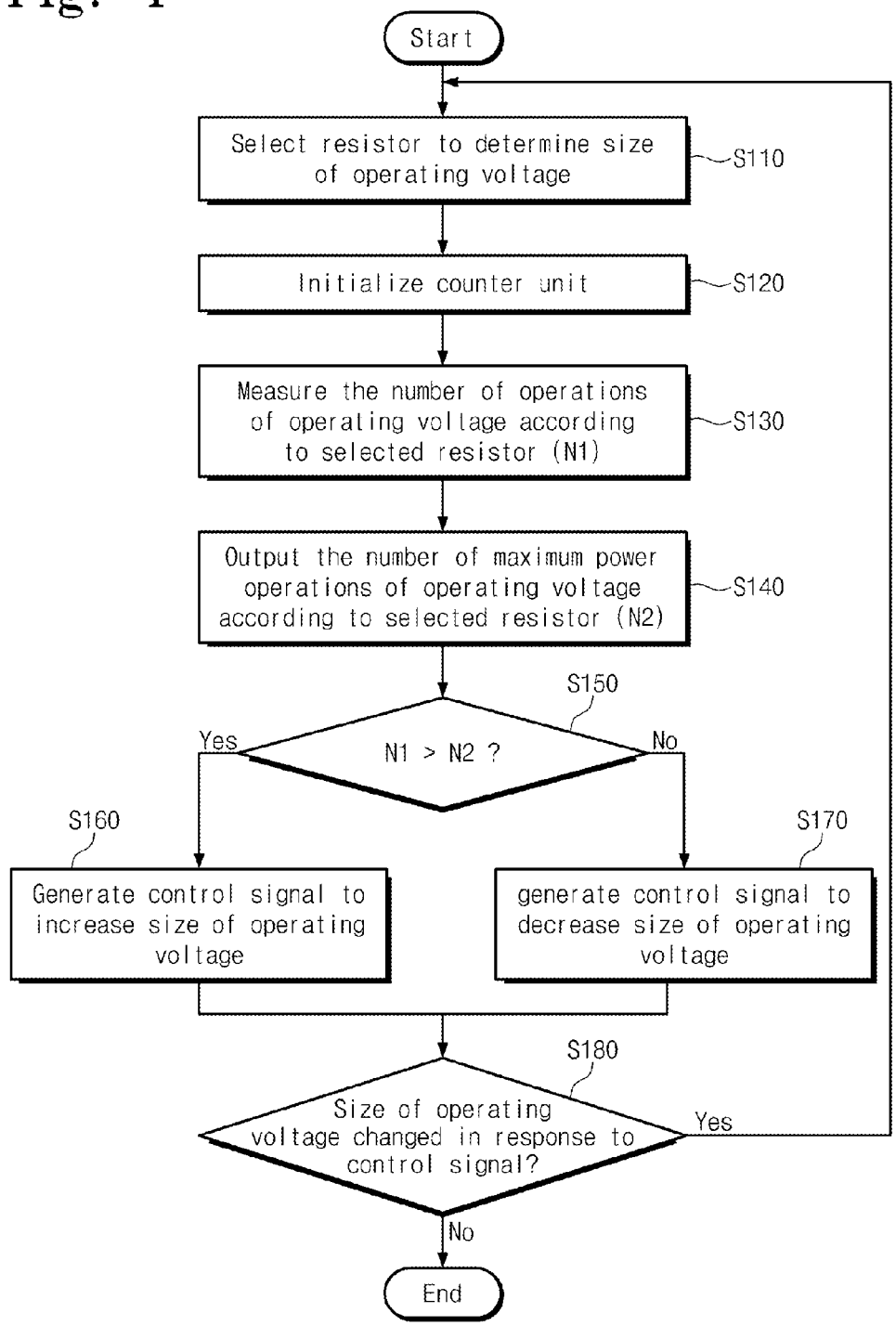
FIG. 4 is a flowchart illustrating operations of the maximum power extraction device of FIG. 1.

FIG. 4 is a flowchart illustrating operations of the maximum power extraction device of FIG. 1. Referring to FIG. 4, the voltage control unit 120 of FIG. 1 determines an operating voltage Vn for adjusting the size of the first power supplied from the solar battery 110 in operation S110. In more detail, the voltage control unit 120 of FIG. 1 selects a resistor with which the operating voltage Vn has the maximum value from among the plurality of resistors R1 to Rn. Here, the first resistor R1 is determined as a resistor with which the operating voltage Vn has the maximum value.

In operation S120, the counter unit 151 of FIG. 1 performs an initializing operation on previous information to measure the number of operations of the NMOS and PMOS transistors M1 and M2 according to the selected operating voltage Vn. In more detail, the counter unit 151 determines the number of operations of the NMOS and PMOS transistors M1 and M2 according to the number of operations that generate the first and second control signals S1 and S2 of the switching control unit 140. Here, the number of operations measured by the counter unit 151 is measured when a size difference of compare signal, i.e., the operating voltage Vn and the reference voltage Vref, become identical. That is, when a size difference of the compare signal is within a predetermined error range, the counter 151 measures the number of operations for a predetermined time.

In operation S130, the counter unit 151 measures the number of operations of the operating voltage Vn according to the selected resistor from among the plurality of resistors R1 to Rn in response to the first and second control signals S1 and S2.

In operation S140, the data unit 152 of FIG. 1 determines the number N2 of operations having the maximum power of the operating voltage Vn according to the selected resistor from among the plurality of resistors R1 to Rn. The data unit 152 stores the number of operations of the maximum power for each operating voltage Vn.

In operation S150, the counter comparator 153 performs a comparison operation to determine whether the number N1 of operations of the operating voltage Vn selected from the voltage control unit 120 is greater than the number N2 of operations of the operating voltage Vn having the maximum power. The resistor selection unit 154 of FIG. 1 generates a select signal SEL for adjusting the size of the operating voltage Vn according to the comparison result.

In operation S160, it shows when the number N1 of operations of the operating voltage Vn selected from the voltage control unit 120 is greater than the number N2 of operations of the operating voltage Vn having the maximum power. Then, the resistor selection unit 154 generates the select signal SEL for increasing the size of the operating voltage Vn, and then, delivers it to the multiplexer 121. The multiplexer 121 selects a resistor for increasing the size of the operating voltage Vn from among the plurality of resistors R1 to Rn in response to the received select signal SEL.

In operation S170, it shows when the number N1 of operations of the operating voltage Vn selected from the voltage control unit 120 is less than the number N2 of operations of the operating voltage Vn having the maximum power. Then, the resistor selection unit 154 generates the select signal SEL for decreasing the size of the operating voltage Vn, and then, delivers it to the multiplexer 121. The multiplexer 121 selects a resistor for decreasing the size of the operating voltage Vn from among the plurality of resistors R1 to Rn in response to the received select signal SEL.

In operation S180, the multiplexer 121 selects a resistor for changing the size of the operating voltage Vn from among the plurality of resistors R1 to Rn in response to the select signal SEL generated from operation S160 or S170. Then, the maximum power extraction device 100 performs operations S110 to S170 repeatedly in order to maximize the size of a power delivered to the load 160. In this way, the load 160 maintains the maximum power according to the iterative processes of operation S110 to S170. Then, when the iterative processes for changing the operating voltage Vn are not performed any more, the maximum power extraction device 100 is terminated.

Figure 5:
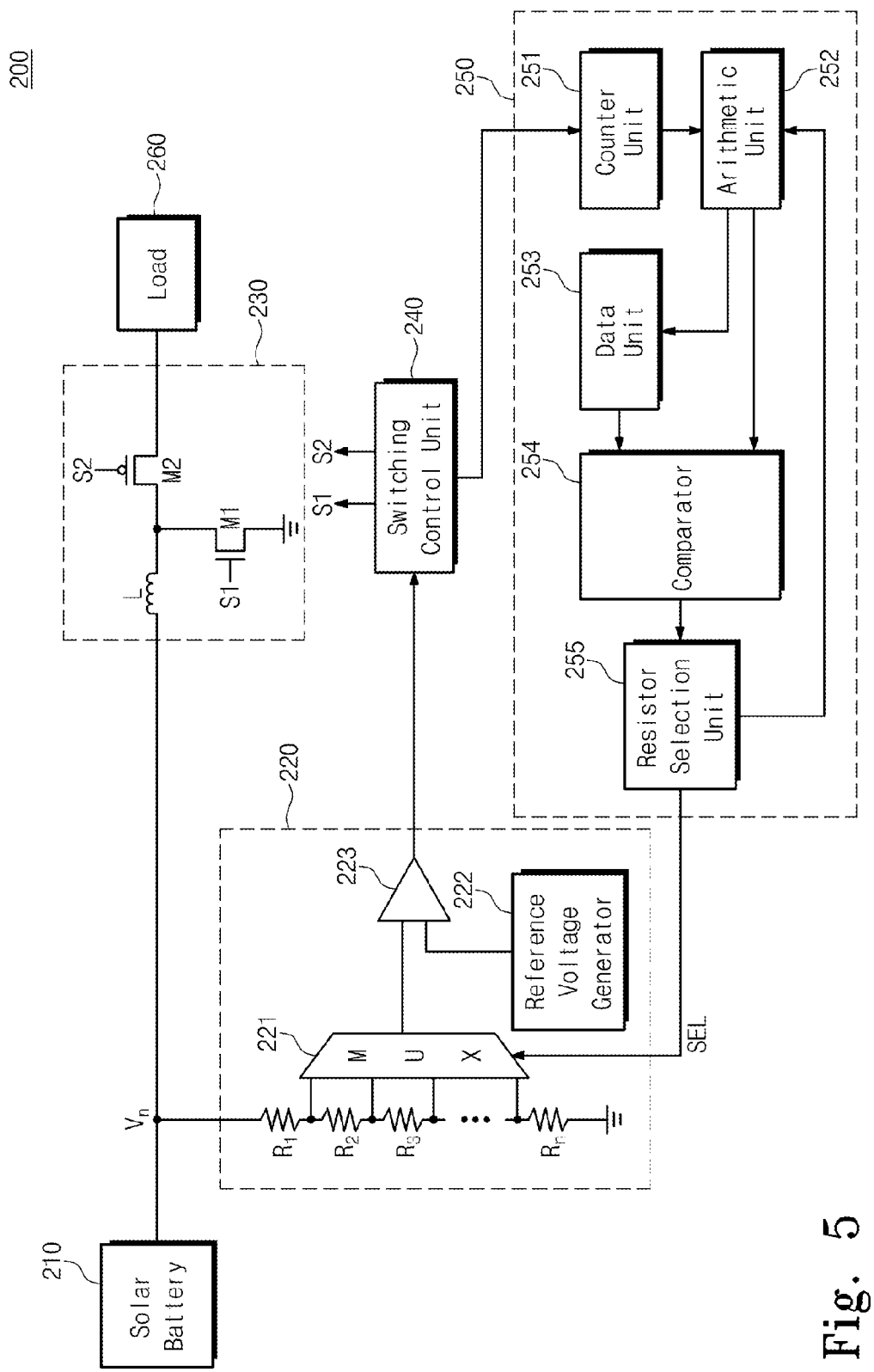
FIG. 5 is a block diagram of a maximum power extraction device according to another embodiment of the present invention.

FIG. 5 is a block diagram illustrating a maximum power extraction device according to another embodiment of the present invention. Referring to FIG. 5, the maximum power extraction device 200 includes a solar battery 210, a voltage control unit 220, a switching unit 230, a switching control unit 240, and a maximum power control unit 250, and a load 260. The maximum power extraction device 200 of FIG. 5 has the same configuration as the maximum power extraction device 100 of FIG. 1, except for the maximum power control unit 250. Accordingly, the maximum power control unit 250 will be described in more detail.

The maximum power control unit 250 includes a counter unit 251, an arithmetic unit 252, a data unit 253, a comparator 254, and a resistor selection unit 245.

The counter unit 251 counts the repeating turn-on and turn-off operations of the NMOS and PMOS transistors M1 and M2 in response to the first and second control signals S1 and S2. The counter unit 251 determines the number of operations of the NMOS and PMOS transistors M1 and M2 in response to the first and second control signals S1 and S2 generated from the switching control unit 240.

Then, the number of operations measured by the counter unit 251 means the size of current. That is, the large number of operations means that a large size of current, and the small number of operations means a small size of current. This is because that forming an induced voltage according to a current applied to the inductor L and discharging it to a load according to operations of the NMOS and PMOS transistors M1 and M2 are regarded as one operation. Then, the counter unit 251 delivers information on the measured number of operations to the arithmetic unit 252.

The arithmetic unit 252 calculates the product of the size of a current according to the number of operations received from the counter unit 251 and the operating voltage Vn so as to measure the size of the first power. The calculating unit receives information on the operating voltage Vn through the resistor selection unit 255. Then, the arithmetic unit 252 delivers information on the measured size of the first power to the data unit 253 and the comparator 254.

The data unit 253 receives the size of the first power measured by the arithmetic unit 252 and delivers the previously-stored size of the second power to the comparator 254. Then, in relation to an initial operation of the maximum power extraction device 200, the data unit 253 delivers initial power information having a set arbitrary value to the comparator 254. Here, the arbitrary value means a power value designated by a user.

The comparator 254 receives the size of the first power from the arithmetic unit 252 and also the size of the second power from the data unit 253, and then, compares them in terms of a size. Then, the comparator 254 delivers a comparison result to the resistor selection unit 255.

The resistor selection unit 255 generates a select signal SEL for changing the size of the operating voltage Vn in response to the comparison result received from the comparator 254. Then, the resistor selection unit 244 delivers the generated select signal SEL to the multiplexer 221. Accordingly, the multiplexer 221 selects one of the plurality of resistors R1 to Rn in response to the received select signal SEL. Additionally, the resistor selection unit 255 delivers information on the operating voltage Vn in response to the select signal SEL to the arithmetic unit 252.

In this way, the maximum power extraction device 200 repeatedly performs an operation for comparing a currently-measured first power value and a previously-measured second power value through the counter unit 251 and the arithmetic unit 252. Therefore, the maximum power extraction device 100 maintains the size of the second power delivered to the load 160.

Figure 6:
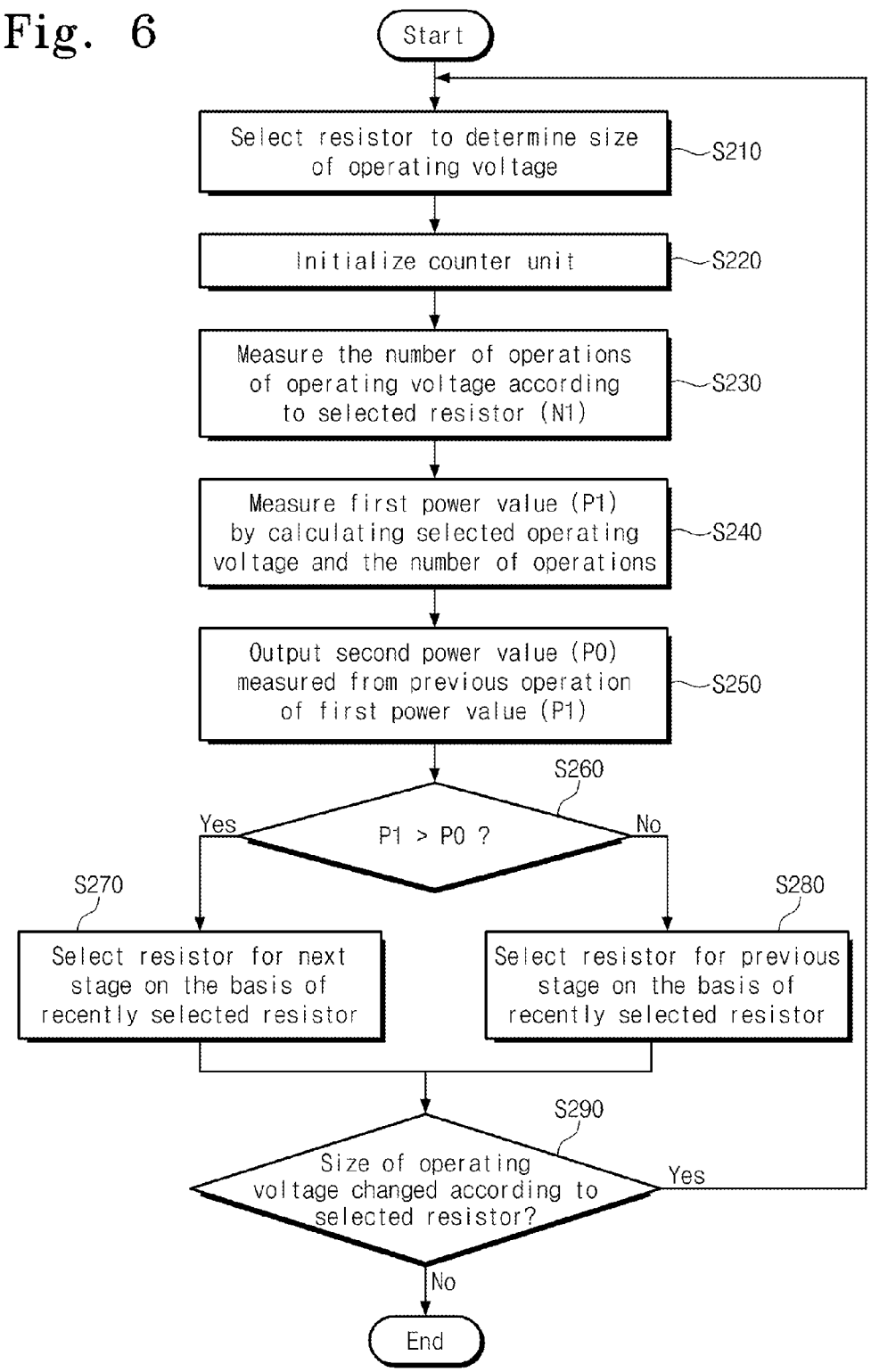
FIG. 6 is a flowchart illustrating operations of the maximum power extraction device of FIG. 5.

FIG. 6 is a flowchart illustrating operations of the maximum power extraction device of FIG. 5. Referring to FIG. 6, operations S210 to S230 are identical to operations S110 to S130 of the maximum power extraction device 100 of FIG. 4. Therefore, description will be made from operation S240.

In operation S240, the product of the size of a current received from the counter 251 through the arithmetic unit 252 and the size of an operating voltage Vn generated from the voltage control unit 220 is calculated. Then, the arithmetic unit 252 delivers the calculated size of the first power P1 to the data unit 253 and the comparator 254.

In operation S250, the size of the second power P0 on previous information is delivered to the comparator 254, and the size of the first power P1 received from the arithmetic unit 243 is stored in the comparator 254.

In operation S260, the comparator 2 compares the size of the first power P1 and the size of the second power P0. In more detail, when the size of the first power P1 is greater than the size of the second power P0, a select signal SEL is generated to select a resistor of the next stage on the basis of a recently-selected resistor. Then, the resistor selection unit 255 delivers the selected select signal SEL to the multiplexer 221.

On the contrary, when the size of the first power P1 is less than the size of the second power P0, a select signal SEL is generated to select a resistor of the previous stage on the basis of a recently-selected resistor. Then, the resistor selection unit 255 delivers the selected select signal SEL to the multiplexer 221.

In operation S270, the case that the size of the first power P1 is greater than the size of the second power P0 is shown. The multiplexer 221 selects a resistor of the next stage on the basis of a recently-selected resistor in response to the received select signal SEL.

In operation S280, the case that the size of the first power P1 is less than the size of the second power P0 is shown. The multiplexer 221 selects a resistor of a previous stage on the basis of a recently-selected resistor in response to the received select signal SEL.

In operation S290, the size of the operating voltage Vn is changed according to the resistor selected from operation S270 or S280. Then, the maximum power extraction device 200 performs operations S210 to S280 in order to maximize the size of a power delivered to the load 260. In this way, the load 160 maintains the maximum power according to the iterative processes of operation S210 to S280. Then, when the iterative processes for changing the operating voltage Vn are not performed any more, the maximum power extraction device 200 is terminated.

In this way, a maximum power extraction device according to an embodiment of the present invention does not include a complex arithmetic unit in order to obtain maximum power. That is, the maximum power extraction device may measure a maximum power by using the number of operations representing the size of current. In this way, since the maximum power extraction device has a simple configuration, it may be effective in terms of cost and production.

According to an embodiment of the present invention, since a configuration such as a voltmeter and an ammeter is not required, a maximum power extraction device is manufactured through simple processes.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A maximum power extraction device comprising:
   a battery;
   a voltage control unit adjusting a size of a first power outputted from the battery according to a resistor selected from a plurality of resistors, and generating a compare signal according to a size difference between an operating voltage adjusting the size of the first power depending on the selected resistor and a reference voltage;
   a switching unit connected between the battery and a load and adjusting a size of the operating voltage according to a size difference of the compare signal in response to first and second switching control signals;
   a switching control unit generating the first and second switching control signals to allow a size between the operating voltage according to the compare signal and the reference voltage to be within an error range; and
   a maximum power control unit measuring the number of first operations obtained by counting the occurrence number of the first or second switching control signals for a predetermined time, when the compare signal is within the error range, wherein the maximum power control unit compares the number of the first operations with the number of second operations obtained by counting a size of a maximum power in the load according to the internally stored operating voltage, and then, generates a select signal for changing a selection on the plurality of resistors on the basis of a comparison result to adjust the size of the first power.

2. The device of claim 1, wherein the battery receives solar energy and converts the received solar energy into electrical energy.

3. The device of claim 1, wherein when the number of the first operations is less than the number of the second operations, the select signal is generated to select a resistor for lowering the operating voltage from among the plurality of resistors, and when the number of the first operations is greater than the number of the second operations, the select signal is generated to select a resistor for raising the operating voltage from among the plurality of resistors, so as to adjust the size of the first power.

4. The device of claim 1, wherein the maximum power control unit comprises:
 a counter unit storing the number of the first operations obtained by counting the occurrence number of the first or second switching control signals;
 a data unit storing the number of the second operations obtained by counting a size of a maximum power in the load according to the operating voltage;
 a counter comparator comparing the number of the first operations with the number of the second operations; and
 a resistor selection unit generating the select signal to adjust the size of the first power on the basis of a comparison result from the counter comparator.

5. The device of claim 1, wherein the voltage control unit comprises:
 the plurality of resistors;
 a multiplexer selecting one of the plurality of resistors in response to the select signal; and
 a comparator comparing a size difference between an output signal for a size of an operating voltage of the selected resistor and a signal of the reference voltage and delivering the compare signal to the switching control unit on the basis of a comparison result.

6. The device of claim 5, wherein the size of the first power is adjusted through a voltage distribution using the plurality of resistors.

7. The device of claim 1, wherein the switching unit converts the size of the first power into a size of a second power through a DC-DC conversion and delivers the converted second power to the load.

8. A maximum power extraction device comprising:
 a battery;
 a voltage control unit adjusting a size of a first power outputted from the battery according to a resistor selected from a plurality of resistors, and generating a compare signal according to a size difference between an operating voltage adjusting the size of the first power depending on the selected resistor and a reference voltage;
 a switching unit connected between the battery and a load and adjusting a size of the operating voltage according to a size difference of the compare signal in response to first and second switching control signals;
 a switching control unit generating the first and second switching control signals to allow a size between the operating voltage according to the compare signal and the reference voltage to be within an error range; and
 a maximum power control unit storing a size of a first power resulting from a product of the number of operations obtained by counting the occurrence number of the first or second switching control signals for a predetermined time and the operating voltage, when the compare signal is within the error range, wherein the maximum power control unit compares the size of the first power with a size of a second power obtained by the most recent multiplication, and generates a select signal to change a selection on the plurality of resistors on the basis of a comparison result.

9. The device of claim 8, wherein the maximum power control unit comprises:
 a counter unit storing the number of the first operations obtained by counting the occurrence number of the first or second switching control signals;
 an arithmetic unit outputting the size of the first power by multiplying the operating voltage by the number of the operations;
 a data unit storing the size of the second power obtained by the most recent multiplication;
 a first comparator receiving the sizes of the first and second powers and compare the received sizes; and
 a resistor selection unit generating the select signal for adjusting the size of the first power on the basis of a comparison result from the first comparator.

10. The device of claim 8, wherein the voltage control unit comprises:
 the plurality of resistors;
 a multiplexer selecting one of the plurality of resistors in response to the select signal; and
 a second comparator comparing a size difference between an output signal for a size of an operating voltage of the selected resistor and a signal of the reference voltage and delivering the compare signal to the switching control unit on the basis of a comparison result.

11. The device of claim 10, wherein the size of the first power is adjusted through a voltage distribution using the plurality of resistors.

12. The device of claim 8, wherein the switching unit converts the size of the first power into a size of a second power through a DC-DC conversion and delivers the converted second power to the load.

* * * * *